(12) United States Patent
Junkers

(10) Patent No.: US 8,978,232 B2
(45) Date of Patent: Mar. 17, 2015

(54) METHOD FOR TIGHTENING AND LOOSENING THREADED CONNECTORS

(76) Inventor: John K. Junkers, Saddle River, NJ (US)

(*) Notice: Subject to any disclaimer, the term of this patent is extended or adjusted under 35 U.S.C. 154(b) by 390 days.

(21) Appl. No.: 13/113,693

(22) Filed: May 23, 2011

(65) Prior Publication Data
US 2011/0220376 A1 Sep. 15, 2011

Related U.S. Application Data

(62) Division of application No. 12/429,040, filed on Apr. 23, 2009, now Pat. No. 8,079,795.

(51) Int. Cl.
| | |
|---|---|
| *B23P 11/00* | (2006.01) |
| *B23P 17/00* | (2006.01) |
| *B23P 19/00* | (2006.01) |
| *B23P 21/00* | (2006.01) |
| *B21D 19/00* | (2006.01) |
| *F16B 37/08* | (2006.01) |
| *F16B 31/02* | (2006.01) |
| *B25B 23/00* | (2006.01) |

(52) U.S. Cl.
CPC .......... *F16B 31/028* (2013.01); *B25B 23/0085* (2013.01)
USPC .................. 29/525.02; 29/525.01; 29/525.04; 29/525.11; 29/712; 29/715; 411/432

(58) Field of Classification Search
CPC ...... F16L 17/04; F16L 21/065; B23B 39/161; B23B 49/005; B21J 15/14; B21J 15/142; B23P 19/10; B23P 21/002; B23P 19/06; B23P 11/00; B23P 19/12; B23P 19/04; A47K 13/26; B25B 21/00; B25B 23/0085; F16B 31/028
USPC ............... 29/525.01, 525.02, 525.04, 525.11, 29/525.12, 712, 714–716, 795, 456; 411/432, 917
See application file for complete search history.

(56) References Cited

U.S. PATENT DOCUMENTS

| | | | | |
|---|---|---|---|---|
| 3,285,120 | A | * | 11/1966 | Kartiala ............................ 411/8 |
| 3,491,838 | A | * | 1/1970 | Wilder et al. .................... 173/73 |
| 3,602,418 | A | * | 8/1971 | Erhardt, Jr. ....................... 227/3 |
| 3,602,976 | A | * | 9/1971 | Grube ......................... 29/407.03 |

(Continued)

*Primary Examiner* — Jermie Cozart
*Assistant Examiner* — Bayan Salone
(74) *Attorney, Agent, or Firm* — Michael J. Striker

(57) ABSTRACT

A method of tightening and loosening threaded connectors in an object includes threadingly connecting a nut with a bolt introduced in the object with interposition of a washer between the nut and the object, turning the nut by a tool to tighten or loosen the bolt in the object with interposition of the washer, forming the washer with an outer body having a radially inner opening larger than a diameter of the bolt and radially outer surface adapted to absorb a reaction force of the tool, optionally also with a radially inner segment engageable with a thread of the bolt and connectable to the radially outer body with a limited axial frictional movement relative to the outer body, and optionally also with a spacer locatable between the radially inner segment and the nut, interposing only said radially outer body of the washer between the nut and the object for regular applications, optionally interposing the radially outer body and the radially inner segment together between the nut and object for applications when even and accurate bolt elongation is necessary, and optionally interposing the radially outer body, the radially inner segment, and the spacer between the nut and the object for applications when a precise bolt load is needed and a bolt elongation must be controlled.

11 Claims, 4 Drawing Sheets

(56) References Cited

U.S. PATENT DOCUMENTS

| | | | |
|---|---|---|---|
| 3,633,446 A * | 1/1972 | Tadahira et al. | 81/57.46 |
| 3,728,933 A * | 4/1973 | Grube | 411/5 |
| 4,702,657 A * | 10/1987 | Jelinek | 411/369 |
| 4,833,776 A * | 5/1989 | Wakamiya et al. | 29/837 |
| 4,887,948 A * | 12/1989 | Calmettes | 411/5 |
| 4,979,857 A * | 12/1990 | Wing | 411/5 |
| 5,046,906 A * | 9/1991 | Bucknell | 411/432 |
| 5,141,373 A * | 8/1992 | Kendall | 411/43 |
| 5,315,894 A * | 5/1994 | Tsukada | 74/526 |
| 5,318,397 A * | 6/1994 | Junkers | 411/432 |
| 5,341,560 A * | 8/1994 | Junkers | 29/525.08 |
| 5,539,970 A * | 7/1996 | Junkers | 29/446 |
| 5,640,749 A * | 6/1997 | Junkers | 29/446 |
| 5,865,581 A * | 2/1999 | Sadri et al. | 411/5 |
| 5,946,789 A * | 9/1999 | Junkers | 29/446 |
| 6,135,687 A * | 10/2000 | Leek et al. | 411/10 |
| 6,254,323 B1 * | 7/2001 | Junkers | 411/14.5 |
| 6,585,467 B2 * | 7/2003 | Junkers | 411/204 |
| 6,810,571 B1 * | 11/2004 | Junkers | 29/452 |
| 6,883,401 B2 * | 4/2005 | Junkers | 81/57.39 |
| 6,905,298 B1 * | 6/2005 | Haring | 411/432 |
| 6,986,298 B2 * | 1/2006 | Junkers | 81/54 |
| 7,003,862 B2 * | 2/2006 | Junkers | 29/452 |
| 7,066,053 B2 * | 6/2006 | Junkers | 81/54 |
| 7,204,667 B2 * | 4/2007 | Uno et al. | 411/338 |
| 7,207,760 B2 * | 4/2007 | Junkers | 411/432 |
| 7,373,709 B2 * | 5/2008 | Fernando et al. | 29/525.01 |
| 7,581,301 B2 * | 9/2009 | Arbona et al. | 29/525.02 |
| 7,997,346 B2 * | 8/2011 | Marshall | 166/378 |
| 8,079,795 B2 * | 12/2011 | Junkers | 411/432 |
| 8,312,613 B2 * | 11/2012 | Marshall | 29/469 |
| 2001/0039858 A1 * | 11/2001 | Junkers | 81/57.39 |
| 2002/0172575 A1 * | 11/2002 | Junkers | 411/432 |
| 2003/0108404 A1 * | 6/2003 | Junkers | 411/432 |
| 2003/0183045 A1 * | 10/2003 | Junkers | 81/54 |
| 2003/0198533 A1 * | 10/2003 | Junkers | 411/533 |
| 2004/0040418 A1 * | 3/2004 | Junkers | 81/55 |
| 2004/0131445 A1 * | 7/2004 | Kjellberg | 411/368 |
| 2005/0001000 A1 * | 1/2005 | Favre-Bulle et al. | 227/2 |
| 2005/0155461 A1 * | 7/2005 | Junkers | 81/55 |
| 2005/0158144 A1 * | 7/2005 | Junkers | 411/266 |
| 2005/0158145 A1 * | 7/2005 | Junkers | 411/303 |
| 2005/0163592 A1 * | 7/2005 | Junkers | 411/303 |
| 2005/0163593 A1 * | 7/2005 | Junkers | 411/303 |
| 2005/0278932 A1 * | 12/2005 | Junkers | 29/525.01 |
| 2005/0279190 A1 * | 12/2005 | Junkers | 81/55 |
| 2005/0286991 A1 * | 12/2005 | Junkers | 411/432 |
| 2008/0010805 A1 * | 1/2008 | Fernando et al. | 29/525.01 |
| 2010/0239390 A1 * | 9/2010 | Junkers | 411/532 |
| 2010/0263194 A1 * | 10/2010 | Morrison et al. | 29/525.04 |
| 2013/0145604 A1 * | 6/2013 | Colombo et al. | 29/525.02 |

* cited by examiner

METHOD FOR TIGHTENING AND LOOSENING THREADED CONNECTORS

CROSS-REFERENCE TO RELATED APPLICATION

This application is a division of patent application Ser. No. 12/409,040, filed on Mar. 23, 2009, now U.S. Pat. No. 8,079,795, whose subject matter is incorporated herein by reference and from which the present application claims its priority under 35 USC 119(a)-)d).

BACKGROUND OF THE INVENTION

The present invention relates to a method of tightening and loosening threaded connectors with the use of the washer.

Tightening and loosening threaded connectors, for example flanges with the use of washers is known. During tightening and loosening a circumferential bolt load is critical for keeping the flanges tight. It is difficult to obtain a desired bolt load at all times simply because there is no tool that can be set to a given bolt load and will ultimately achieve that bolt load. The reason is that during the process of tightening there are too many variables.

The two most popular bolting systems for tightening and loosening threaded connectors use torque or tension. When the torque is used for tightening or loosening, the torque has unknown friction, so that with the same torque, different bolt loads are obtained even on the same flange. When the tension is used for tightening or loosening threaded connectors, the tension has an unknown bolt relaxation, so that with the same identical pulling force of the bolt, different final bolt loads are obtained even on the same flange. This is because the nut is usually tightened by hand while the bolt is elongated by pull, and thus the bolt relaxation, which is to tighten the nut, depends on cleanness of threads or amount of debris underneath the nut, the smoothness of the nut and the joint face, perpendicularity joint face relative to the bolt axis, etc.

SUMMARY OF THE INVENTION

Accordingly, it is an object of the present invention to provide a method of tightening and loosening threaded connectors with the use of the washer, which eliminate at least some of these advantages of the prior art.

In keeping with these objects and with others which will become apparent hereinafter, one feature of the present invention resides, briefly stated, in a method of tightening and loosening threaded connectors in an object, comprising the steps of threadingly connecting a nut with a bolt having an axis and introduced in the object with interposition of a washer between the nut and the object so that its first bearing face surface on one axial side cooperates with the nut and its second bearing face surface on an opposite axial side cooperates with the object; turning the nut by a tool so as to tighten or loosen the bolt in the object with interposition of the washer; forming the washer with an outer body having a radially inner opening larger than a diameter of the bolt and radially outer surface adapted to absorb a reaction force of the tool, optionally also with a radially inner segment engageable with a thread of the bolt and connectable to the radially outer body with a limited axial frictional movement relative to the outer body, and optionally also with a spacer locatable between the radially inner segment and the nut; interposing only said radially outer body of the washer between the nut and the object for regular applications when an even and accurate bolt elongation is not necessary and using the radially outer surface of the body to absorb a reaction force of the tool, so that when the tool applies a turning force to the nut and an equal but opposite reaction force to the radially outer body the nut turns while the radially outer body stands still, and in this case the washer composed only of the radially outer body functions as a reaction washer; optionally interposing the radially outer body and the radially inner segment together between the nut and object for applications when even and accurate bolt elongation is necessary, so that when the nut is turned by the tool at a given force and the radially outer body receives the given force in an opposite direction from the tool the radially outer body stands still while the radially inner segment engaging with the thread of the bolt positively stops the bolt from turning and allows the bolt only to elongate or to relax, and in this case the washer composed of the radially outer body and the radially inner segment functions as a tension washer; and optionally interposing the radially outer body, the radially inner segment, and the spacer between the nut and the object for applications when a precise bolt load is needed and a bolt elongation must be controlled so that when the nut is turned by the tool at a given force and the radially outer body receives the given force in an opposite direction from the tool the radially outer body stands still while the radially inner segment engaging with the threads of the bolt positively stops the bolt from turning and allows the bolt only to elongate or to relax and at the same time the radially inner segment moves axially, and the spacer limits the axial movement of said segment, and in this case the washer composed of the radially outer body, the radially inner segment, and the spacer functions as a high precision washer.

Another feature of the present invention resides in that the method further comprising providing outer body with engaging means on the radially outer surface to engage a tool to hold the outer body stationary while the nut is being turned by a tool; and forming the opposite axial side of the outer body so as to create a friction with the object to avoid a turn-along of the washer under severe conditions, so that the washer remains stationary disregarding if the radially inner segment is arranged in the radially inner opening of the outer body or not, and so that the one axial side controls a facial friction of the nut A further feature of the present invention resides in that the method further comprising configuring the radially outer body and the radially inner segment so that the radially inner segment starts moving axially only upon a pre-closure of two parts of the object which no longer changes during the tightening process, so that any movement of the radially inner segment inside the radially outer body reflects an actual bolt elongation and therefore a bolt load.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
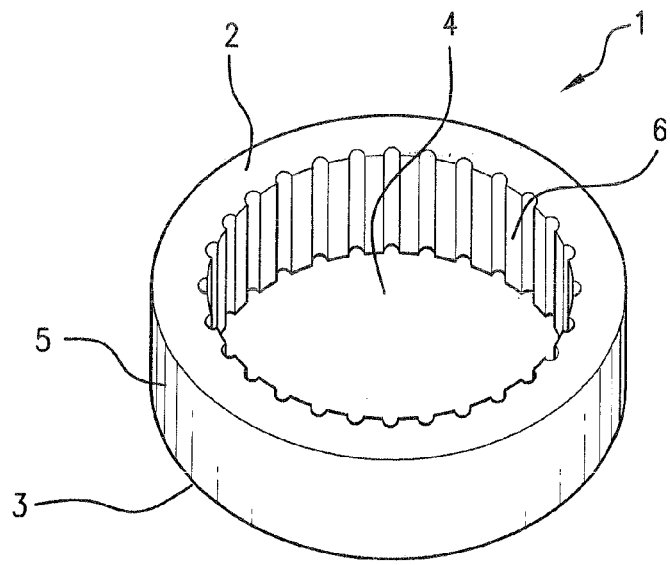
FIGS. 1, 2 and 3 are views showing a method of tightening and loosening threaded connectors with a washer in accordance with the present invention.

Tightening and loosening a threaded connector, which includes a nut, and a bolt having an axis and introduced into an object, is performed with interposition of the washer between the nut and the object. The washer has a body which is identified as a whole with reference numeral 1 as shown in FIG. 1. The body 1 has a first bearing face surface 2 on its one axial side, provided for cooperating with the nut, and also a second bearing face surface on an opposite axial side, provided for cooperation with an object. The body 1 has a radially inner opening 4 which is larger than a diameter of the bolt. It also has a radially outer surface 5 adapted to absorb a reaction force of the bolt.

Figure 2:
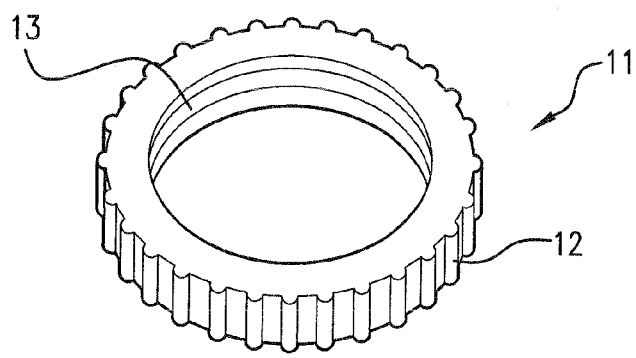

The washer can optionally have a radially inner segment which is identified as a whole with reference numeral 11 as shown in FIG. 2. The radially inner segment 11 is insertable into the opening 4 of the body 1 and has a radially outer surface 12 which is engageable with a radially inner surface 6 of the body 1. It also has a radially inner surface 13 which is engageable with the bolt.

Figure 3:
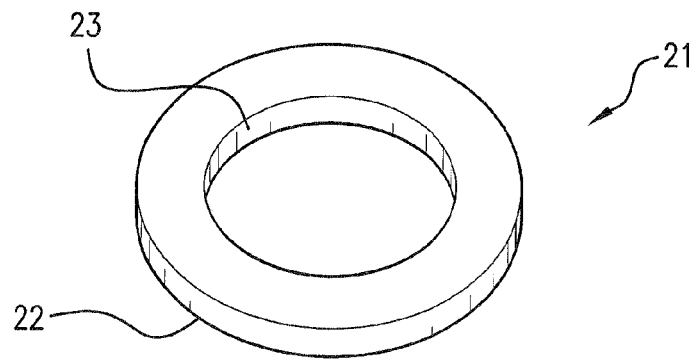

The washer can further have optionally a spacer which is identified as a whole with reference numeral 21 as shown in FIG. 3. The spacer 21 has an outer surface 22 with a transverse size, for example a diameter, which can be smaller than a diameter of the radially inner surface 6 of the body 1. It also has a radially inner surface 23 with a transverse size, for example a diameter, which is larger than the outer diameter of the bolt.

Figure 5:
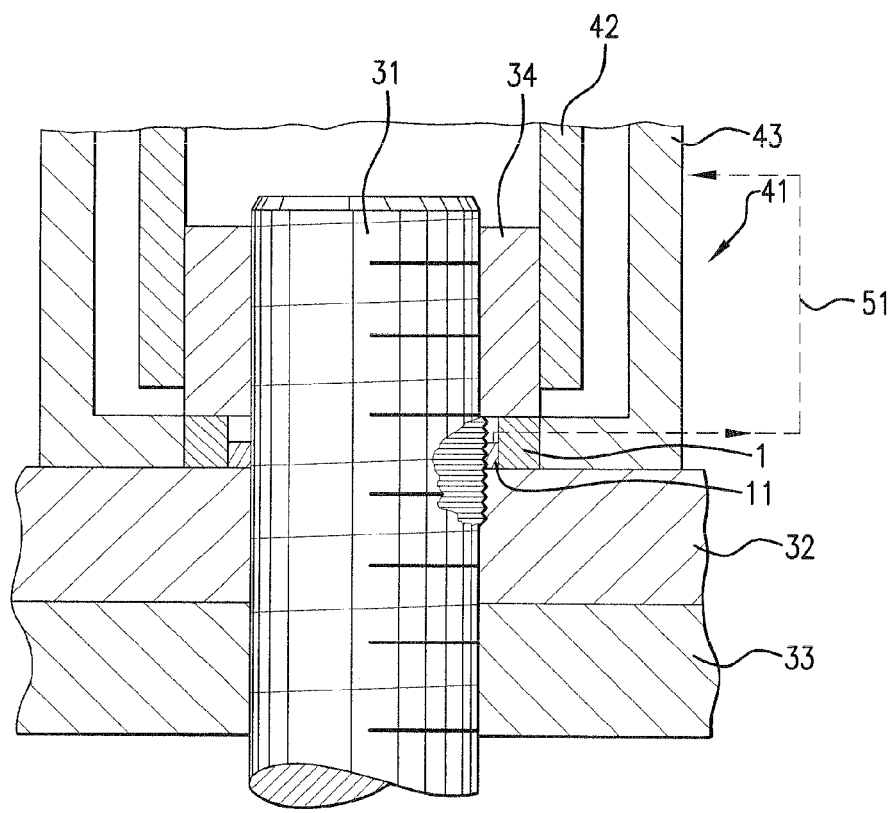
Figure 6:
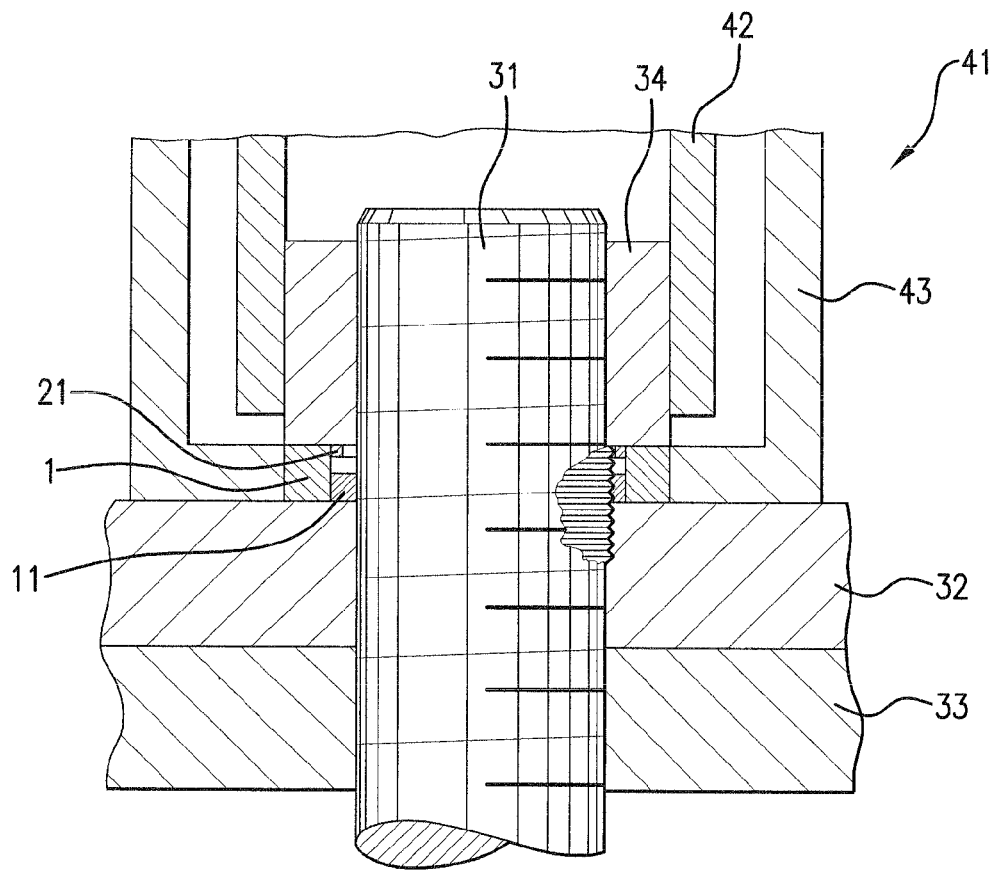

FIGS. 5, 6 and 7 illustrate tightening/loosening of threaded connectors with the use of the washer in accordance with the present invention. The threaded connector showing these figures includes a bolt 31 which is inserted in a hole of an object composed of two elements 32 and 33 to be connected to one another, a nut 34 which is screwable on the bolt 31, and the washer configured in accordance with the present invention and arranged between the nut 34 and the object 32, 33.

When as shown in FIG. 1 a torque power tool 41 is placed on the fastener to tighten or loosen the nut 34, and only the outer body 1 of the washer is placed between the nut 34 and the object 32, 33, a turning portion 42 of the torque power tool 41 is connected to the nut 34 and turns the nut to overcome the thread friction with the bolt 31 and facial friction with the outer body 1 of the washer to turn the nut 34, while a reaction portion 43 of the torque power tool 41 is connected to the body 1 of the washer to absorb the reaction force due to the facial friction of the body 1 of the washer with the nut 34 and its facial friction with one side of the parts 32, 33 of the object, so that the washer and the bolt do not turn, but absorb the reaction force of the torque power tool.

It is to be understood that in order to engage the nut 34 by the turning portion 42 of the torque power tool 41, and to engage the reaction portion 43 of the torque power tool 41 with the body 1 of the washer, the adjoining parts can be provided with connecting means, formed for example as roughenings, polygonal surfaces, splines, etc.

Figure 4:
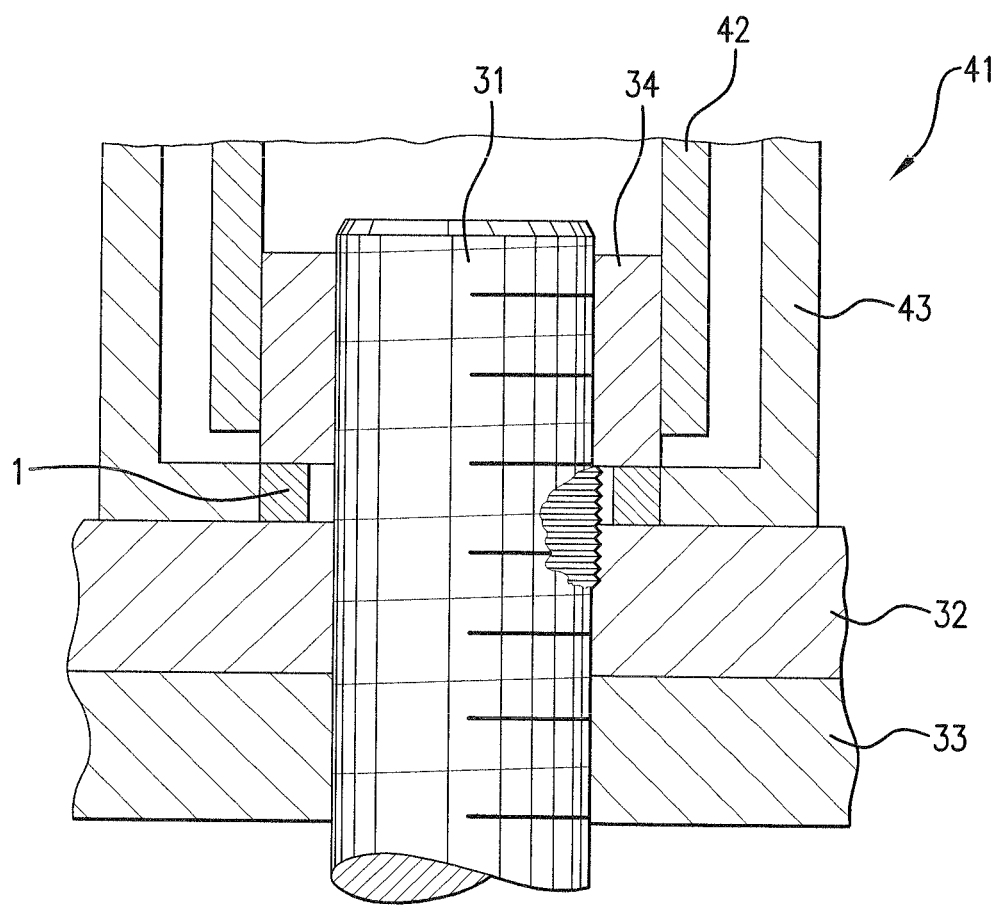
FIGS. 4, 5 and 6 are views showing a method of tightening or loosening threaded connectors with a washer for various applications.

In the embodiment of FIG. 4 when only the radially outer body 1 of the washer is interposed between the nut and the object, the tightening or loosening is carried out for a regular application when an even and accurate bolt elongation is not absolutely necessary. The radially outer surface of the body 1 is used to absorb a reaction force of the tool, while the tool applies a turning force to the nut and an equal but opposite reaction force to the radially outer body, so that the nut turns but the radially outer body 1 stands still. The washer which is composed only of the radially outer body 1 functions as a reaction member.

In the embodiment shown in FIG. 5 the tightening or loosening of the threaded connector is performed by the tool 41, wherein the washer located between the nut 34 and the object 32, 33 includes the outer body 1 and the inner segment 11. The inner thread of the radially inner surface 13 of the segment 11 engages with the outer thread of the bolt 31, while the radially outer surface 12 of the segment 11 engages with the radially inner surface 6 of the outer body 1, for example by axial splines, interengaging press-fit, etc. In this embodiment when the radially outer body 1 stands still while the radially inner segment 11 engaging with a thread of the bolt 31 positively stops the bolt from turning and allows the bolt only to elongate or to relax, the washer, which now includes the radially outer body 1 and the radially inner segment 11, functions as a tension washer.

When the torque power tool 41 is placed on the fastener so as to tighten or loosen the nut 34, the turning portion 42 of the torque power tool 41 is connected to the nut 34 and turns the nut to overcome the thread friction with the bolt 31 and the facial friction with the washer to turn the nut 31, while the reaction portion 43 of the torque power tool 41 is connected to the body 1 of the washer to absorb the reaction force due to the facial friction of the washer with the nut 34 and its facial friction with one side of the parts 32, 33. The interaction of the inner thread of the inner segment 11 with the outer thread of the bolt 31 prevents the bolt from turning, and during the turning of the nut the bolt 31 is pulled axially upwardly, while the segment 11 moves axially upwardly relative to the body 1.

In accordance with the embodiments shown in FIG. 6, the tightening or loosening a threaded connector is performed, which includes the bolt 31, the nut 34, and the washer comprising the outer body 1, the segment 11, and the spacer 21.

When the torque power tool 41 is placed on the fastener to tightener to tighten or loosen the nut 34 on the bolt 41, the turning portion 42 of the torque power tool 41 is connected to the nut 34 and turns the nut to overcome its friction with the bolt 31 and the facial friction with the washer to turn the nut 34, while the reaction portion 43 of the torque power tool 41 is connected to the washer to absorb the reaction force due to the facial friction of the washer with the nut 34 and its facial friction with one side of the part 32, 33. The outer body 1 of the washer does not turn, the segment 11 also does not turn and holds the bolt 31 from turning. When the turning of the nut 34 causes the displacement of the bolt 31 in an axially direction, the segment 11 also moves axially. Its movement, however, is limited by the spacer 21, and the inner segment stops when the upper axial surface of the segment 11 reaches the lower axial surface of the spacer 21. In this case the washer composed of the radially outer body 1, the radially inner segment 11, and the spacer 21, functions as a high precision washer.

In accordance with the present invention the outer body 1 and the inner segment 11 are formed so that the inner segment 11 starts moving axially only upon a pre-closure of the parts 32, 33, which no longer changes during the tightening process. Therefore, any movement of the segment 11 inside the outer body 1 reflects the actual bolt elongation and thus the bolt load. For this purpose the inter-engagement of the radially outer surface of the segment 11 and the radially inner surface of the body 1 can be selected to perform this particular function. When the segment 11 is for example press-fit in the hole of the outer body 1, the tightness of the press-fit created by a corresponding pressure applied when the inner segment 11 is forcedly introduced in the outer body 1 is selected so that the segment 11 is first held inside the outer body 1 immovably during the process of pre-closing of the parts 32, 33, and then it disengages from the outer body 1 when the pre-closure has been completed and starts moving axially relative to the outer body 1 after the pre-closure. As a result, the axial movement of the segment 11 inside the outer body 1 exactly corresponds to the actual elongation and therefore the load of the bolt 31.

In accordance with a further feature of the present invention, the movement of the segment 11 can be monitored, so that this movement is stopped when the desired bolt elongation is achieved, to stop the bolt from stretching further. For this purpose it can be preliminarily determined what is the length of the axial movement of the segment 11 to achieve the desired bolt elongation. Electronic means can be used for monitoring the movement of the segment 11 and they can include, for example, a sensor provided in the interior of the outer body 1 and detecting the moment when the segment 11 covers the above-identified distance, so that a signal is sent at this moment to the tool to stop operating.

The mechanical construction can include a stop which can be also provided in the interior of the outer body 1, so that when the inner segment 11 reaches the stop, a strain gauge provided on the stop sends a signal to the tool to stop operating. The same results can be achieved visually by an operator who, when he sees the segment 11 completely covering the above mentioned distance, simply stops the tool from operating. Electronic and mechanical options are identified with reference numeral 51 and FIG. 6, in which a signal from the sensor or mechanical stop is used for stopping the tool 41.

The washer has an axis, one axial side to face the nut and an opposite axial side to face the object, a hole to clear a diameter of the bolt 31, and an engaging means on the outside to engage a tool to hold the washer stationary while the nut 34 is being turned by a tool. In accordance with the present invention, the opposite axial side is formed so as to create a friction with the object 32, 33 to avoid a turn-along of the washer under severe conditions, so that the washer remains stationary disregarding if the radially inner segment 11 is arranged in the hole or not, and so that the one axial side controls a facial friction of the nut 34.

It will be understood that each of the elements described above, or two or more together, may also find a useful application in other types of methods differing from the types described above.

While the invention has been illustrated and described as embodied in a method for tightening and loosening threaded connectors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of tightening and loosening threaded connectors in an object, comprising the steps of
    threadingly connecting a nut with a bolt having an axis and introduced in the object with interposition of a washer between the nut and the object so that a washer first bearing face surface on one axial side cooperates with the nut and a washer second bearing face surface on an opposite axial side cooperates with the object;
    turning the nut by a tool so as to tighten or loosen the bolt in the object with interposition of the washer;
    forming the washer with an outer body having a radially inner opening larger than a diameter of the bolt, a radially outer surface adapted to absorb a reaction force of the tool, the outer body formed with a radially inner surface engageable with a radial outer surface of a radially inner segment, the radially inner segment insertable into the radial inner opening of the outer body and including a radially inner surface engageable with a thread of the bolt, wherein said radial outer surface of the radially inner segment is connectable to the radially outer body with a limited axial frictional movement relative to the outer body through use of axial splines or interengaging press fitting such that the washer functions as a tension washer; and
    interposing only said radially outer body of the washer between the nut and the object for regular applications when an even and accurate bolt elongation is not necessary and using the radially outer surface of the body to absorb a reaction force of the tool, so that when the tool applies a turning force to the nut and an equal but opposite reaction force to the radially outer body the nut turns while the radially outer body stands still, and in this case the washer composed only of the radially outer body functions as a reaction washer.

2. The method as defined in claim 1, further comprising providing the washer outer body with engaging means on the radially outer surface to engage a tool to hold the outer body stationary while the nut is being turned by a tool; and forming the opposite axial side of the outer body so as to create a friction with the object to avoid a turn-along of the washer under severe conditions, so that the washer remains stationary disregarding if the radially inner segment is arranged in the radially inner opening of the outer body or not, and so that the one axial side controls a facial friction of the nut.

3. The method as defined in claim 1, further comprising configuring the radially outer body and the radially inner segment so that the radially inner segment starts moving axially only upon a pre-closure of two parts of the object which no longer changes during the tightening process, so that any movement of the radially inner segment inside the radially outer body reflects an actual bolt elongation and therefore a bolt load.

4. The method as defined in claim 1, and further comprising stopping an operation of the tool when the radially inner segment has moved to achieve a desired bolt elongation and therefore a desired bolt load.

5. The method as defined in claim 1, wherein step of forming the washer further comprises interposing a spacer between the radially inner segment and the nut.

6. The method according to claim 1, wherein an axial length of the radial inner segment is less than or equal to an axial length of the outer body.

7. The method as defined in claim 1, further comprising the step of interposing the radially outer body and the radially inner segment together between the nut and object for applications when even and accurate bolt elongation is necessary, so that when the nut is turned by the tool at a given force and the radially outer body receives the given force in an opposite direction from the tool the radially outer body stands still while the radially inner segment engaging with the thread of the bolt positively stops the bolt from turning and allows the bolt only to elongate or to relax, and in this case the washer composed of the radially outer body and the radially inner segment functions as a tension washer.

8. The method as defined in claim 7, wherein said step of interposing said radially outer body of the washer so that the radially inner segment engages with the thread of the bolt and positively stops the bolt from turning includes monitoring the movement of said radially inner segment electronically and stopping the tool correspondingly.

9. A method of tightening and loosening threaded connectors in an object, comprising the steps of threadingly connecting a nut with a bolt having an axis and introduced in the object with interposition of a washer between the nut and the object so that a washer first bearing face surface on one axial side cooperates with the nut and a washer second bearing face surface on an opposite axial side cooperates with the object; turning the nut by a tool so as to tighten or loosen the bolt in the object with interposition of the washer; forming the washer with an outer body having a radially inner opening larger than a diameter of the bolt and a radially outer surface adapted to absorb a reaction force of the tool and a radially inner segment engageable with a thread of the bolt and connectable to the radially outer body with a limited axial frictional movement relative to the outer body; interposing only said radially outer body of the washer between the nut and the object for regular applications when an even and accurate bolt elongation is not necessary and using the radially outer surface of the body to absorb a reaction force of the tool, so that when the tool applies a turning force to the nut and an equal but opposite reaction force to the radially outer body the nut turns while the radially outer body stands still, and in this case the washer composed only of the radially outer body functions as a reaction washer; and interposing the radially outer body, the radially inner segment, and a spacer between the nut and the object for applications when a precise bolt load is needed and a bolt elongation must be controlled so that when the nut is turned by the tool at a given force and the radially outer body receives the given force in an opposite direction from the tool the radially outer body stands still while the radially inner segment engaging with the threads of the bolt positively stops the bolt from turning and allows the bolt only to elongate or to relax and at the same time the radially inner segment moves axially, and the spacer limits the axial movement of said segment, and in this case the washer composed of the radially outer body, the radially inner segment, and the spacer functions as a high precision washer.

10. The method as defined in claim 9, wherein said step of interposing said radially outer body and the radially inner segment together so that the radially outer body stands still while the radially inner segment engages with the thread of the bolt and positively stops the bolt from turning includes monitoring the movement of said radially inner segment mechanically and stopping the tool correspondingly.

11. The method according to claim 9, wherein an axial length of the radial inner segment is less than or equal to an axial length of the outer body.

\* \* \* \* \*